United States Patent [19]

Yamaoka et al.

[11] Patent Number: 5,180,129
[45] Date of Patent: Jan. 19, 1993

[54] SUSPENSION STRUT CONSTRUCTION

[75] Inventors: Fumiyuki Yamaoka; Mitsuo Sasaki; Chiharu Nakazawa; Hiroyuki Sugiyama, all of Kanagawa, Japan

[73] Assignee: Atsugi Unisia Corporation, Kanagawa, Japan

[21] Appl. No.: 682,474

[22] Filed: Apr. 9, 1991

[30] Foreign Application Priority Data

Apr. 10, 1990 [JP] Japan .................. 2-38893[U]
Feb. 27, 1991 [JP] Japan .................. 3-9733[U]

[51] Int. Cl.⁵ .................................................. B60G 15/06
[52] U.S. Cl. ............................................ 248/230; 248/903; 280/668; 280/96.1
[58] Field of Search .............. 248/682, 230, 916, 903; 280/668, 96.1, 93

[56] References Cited

U.S. PATENT DOCUMENTS

| 1,297,533 | 3/1919 | Benkent | 248/916 X |
| 4,194,760 | 3/1980 | Shiomi et al. | 280/668 X |
| 4,531,618 | 7/1985 | Kobiske et al. | 280/668 X |

FOREIGN PATENT DOCUMENTS

| 0083669 | 7/1983 | European Pat. Off. |
| 0279135 | 8/1988 | European Pat. Off. |
| 1529479 | 10/1978 | United Kingdom |
| 1579930 | 11/1980 | United Kingdom |
| 2050968 | 1/1981 | United Kingdom |

Primary Examiner—Alvin C. Chin-Shue
Attorney, Agent, or Firm—Bachman & LaPointe

[57] ABSTRACT

In order to enable a reduction in the weight of a bracket which forms part of a suspension strut, the bracket is press formed from sheet metal in a manner which forms first and second main sections, a bridge-like connecting section and a U-shaped connection flange which extends along all three of the just mentioned sections. The bracket components are configured so as to have two or more hemi-cylindrical shaped reduced diameter portions which fit against the outer periphery of a strut tube and which have edges along which welds can be formed. Box-like projected sections defined in the two main sections between the hemi-cylindrical portions define spaces which have rectangular cross-sections about the periphery of the strut tube.

10 Claims, 9 Drawing Sheets

SUSPENSION STRUT CONSTRUCTION

FIELD OF THE INVENTION

The present invention relates generally to a suspension strut and more specifically to a construction which enables the unsprung mass of the strut to be reduced.

DESCRIPTION OF THE PRIOR ART

JP-A-57-16641 discloses a strut arrangement wherein the lower portion thereof is provided with a bracket via which connection with the road wheel structure is facilitated. This bracket is formed of two elements, an inner bracket and an outer one, and is arranged so that is surrounds the entire periphery of the strut tube.

However, this arrangement encounters the drawback that the thickness of the sheet metal from which the inner and outer bracket elements are formed cannot be reduced for the purposes of reducing the unsprung mass. That is to say, it is necessary to maintain a given minimum amount of structural strength and this requirement inhibits reducing the unsprung mass to a desirable level.

SUMMARY OF THE INVENTION

It is an object of the present invention to provided a bracket construction which enables the weight of the same to be reduced while providing the required amount of structural strength.

In brief, the above object is achieved by an arrangement wherein the bracket is press formed from sheet metal in a manner which forms first and second main sections, a bridge-like connecting section and a U-shaped connection flange which extends along all three of the just mentioned sections. The bracket components are configured so as to have two or more hemi-cylindrical shaped reduced diameter portions which fit against the outer periphery of a strut tube and which have edges along which welds can be formed. Box-like projected sections defined in the two main sections between the hemi-cylindrical portions define spaces which have rectangular cross-sections about the periphery of the strut tube.

More specifically, a first aspect of the present invention comes in a suspension strut having a strut tube and which features: a bracket said bracket including: means defining a plurality of sites at which said bracket can be fixedly connected to the strut tube; and means defining at least one box shaped projections adjacent the sites at which the bracket can be fixedly connected to the strut tube.

A second aspect of the invention comes in a suspension strut having a strut tube and features a bracket, said bracket being press formed from sheet metal in a manner to define a plurality of essentially hemi-cylindrical shaped portions which are adapted to be placed in contact with the outer periphery of the strut tube and to be fixedly connected thereto via welding, said bracket further being formed to have a projection portion which is located between the plurality of hemi-cylindrical shaped portions and which defines an essentially uniform cross-sectional space as taken in the axial direction of the strut tube, between the inner surface of the bracket and the outer periphery of the strut tube.

Another aspect of the invention comes in a bracket for use with a suspension strut which features: first and second side members, the first and second side members being adapted to extend axially along the external periphery of a tubular member which forms part of the strut; a connecting member which is formed integrally with the first and second side members; an essentially U-shaped flange which extends along the first and second side members and the connecting member, said U-shaped flange being formed with at least one pair of connection bolt holes, which are coaxial and located opposite one another; and a first essentially hemi-cylindrically shaped portion formed in the connecting member which is adapted to contact the tubular member and to have an edge welded to the tubular member.

A further aspect of the invention comes in that the bracket described immediately above, further features: a second essentially hemi-cylindrically shaped portion formed in the connecting member which is adapted to contact the tubular member; and means defining a cut-out in the second hemi-cylindrically shaped portion, the cut out having opposed edges which extend in the circumferential direction of the tubular member which the second essentially hemi-cylindrically shaped portion formed in the connecting member, is adapted to contact, the edges providing sites where welds can be formed to connect the bracket to tubular member.

A yet further aspect of the invention comes in that the above described bracket further features: means defining first and second box-like projections in said first and second side members, said first and second box-like projections defining spaces between the bracket and the tubular member.

DETAILED DESCRIPTION OF THE PREFERRED EMBODIMENTS

Figure 2:
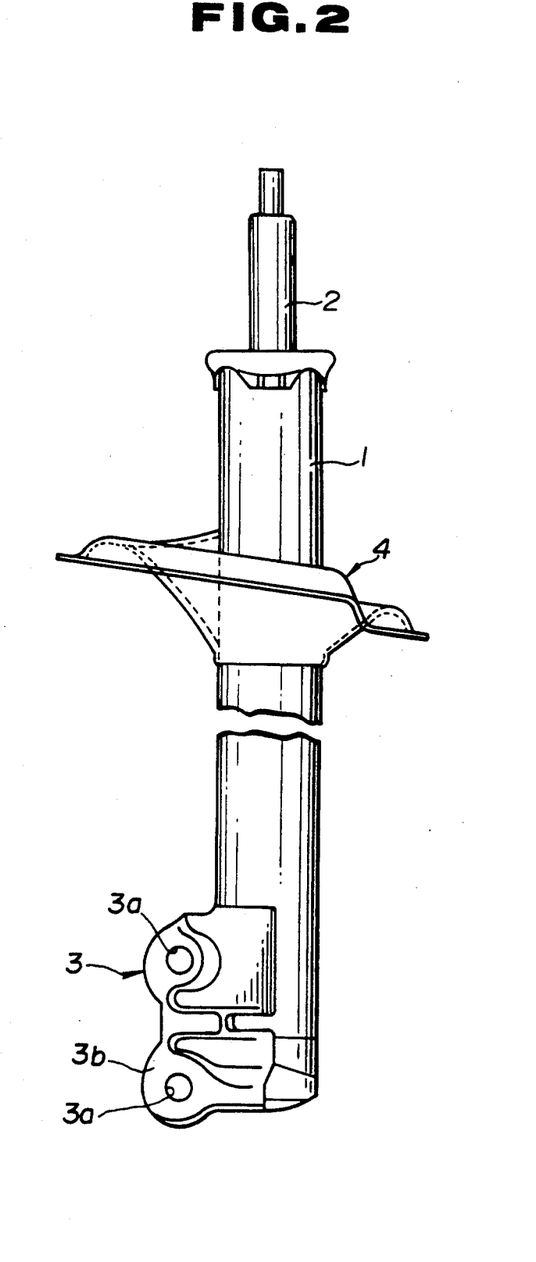
FIG. 2 is a side elevation showing a suspension strut member provided with a the bracket according to the first embodiment.

FIG. 2 shows a first embodiment as applied to a suspension strut. In this instance the illustrated arrangement comprises an outer strut tube 1, an inner cylinder tube which is disposed within the strut tube and which defines a reservoir chamber therebetween (neither illustrated); a piston rod 2 which extends upwardly from within the strut tube 1; a mounting bracket 3 which is fixedly connected to the lower end of the outer tube 1 (as it will be referred to hereinafter); and a spring seat 4.

Figure 1:
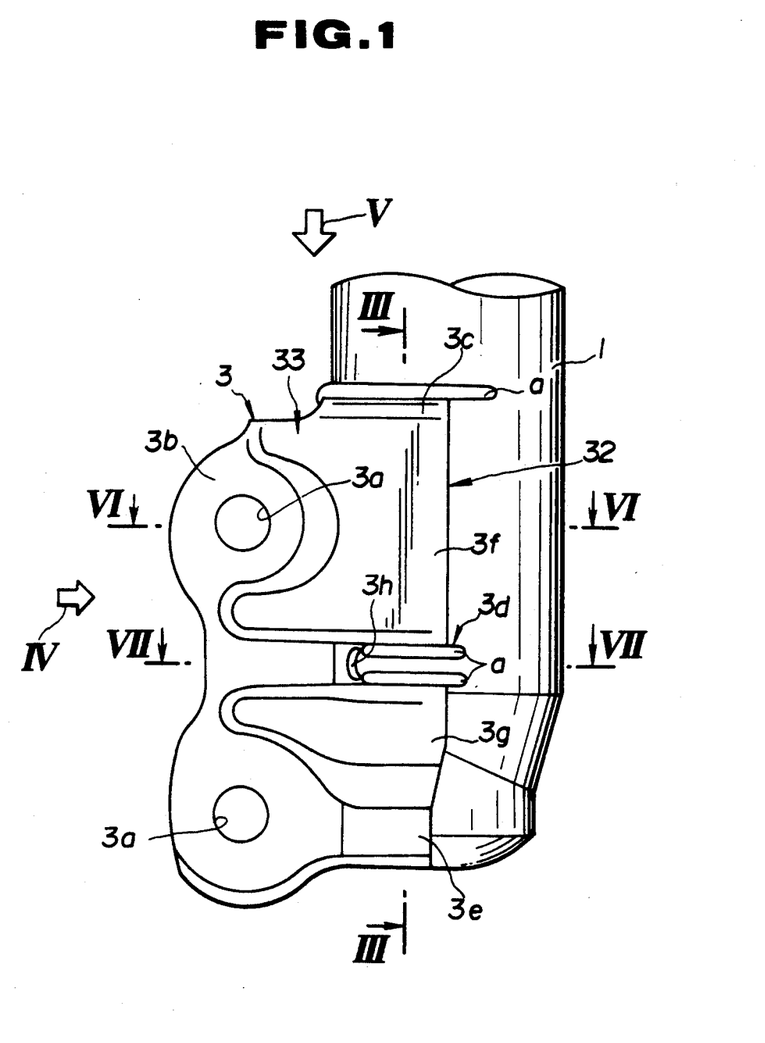
FIG. 1 is a side elevation of a bracket according to a first embodiment of the present invention.
Figure 4:
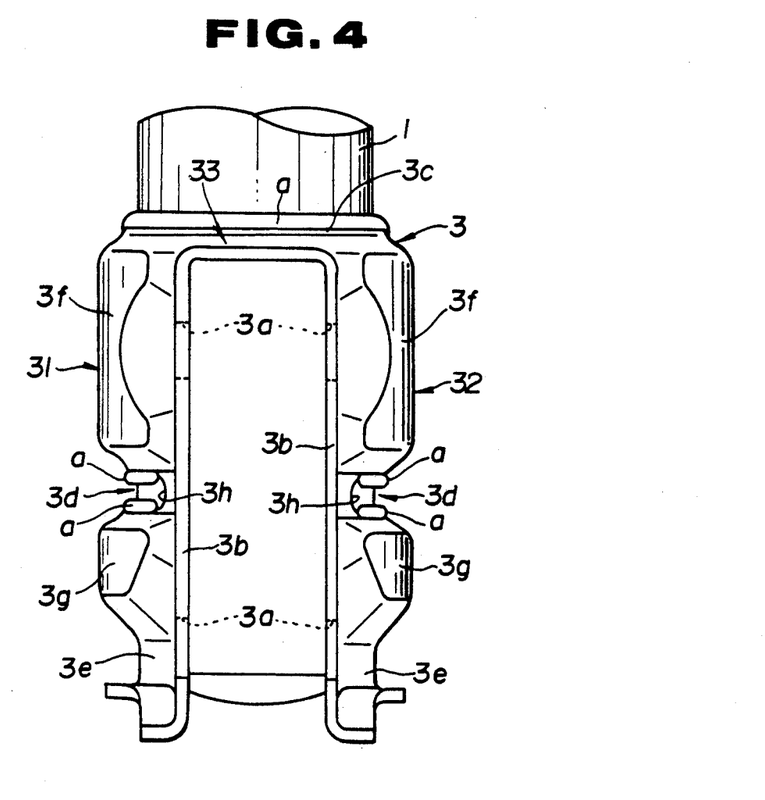
FIG. 4 is a elevation as viewed in the direction of arrow IV of FIG. 1.
Figure 5:
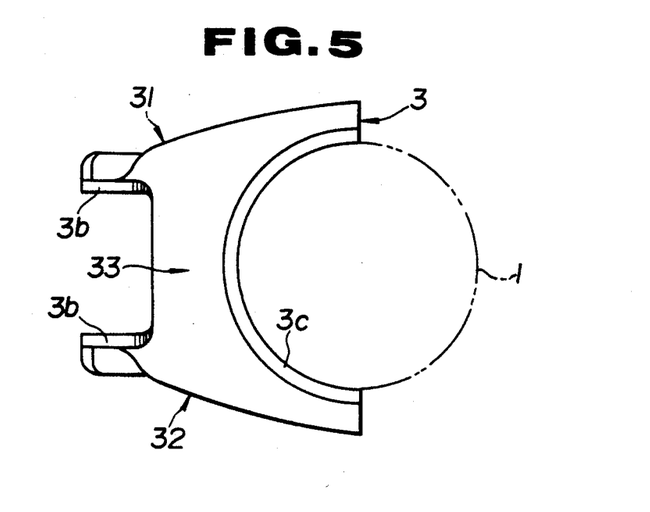
FIG. 5 is a plan view as viewed in the direction of arrow V of FIG. 1.
Figure 6:
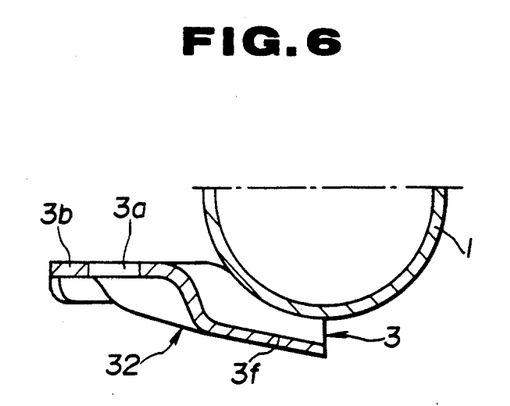
FIG. 6 is a sectional view as taken along section line VI—VI of FIG. 1.
Figure 7:
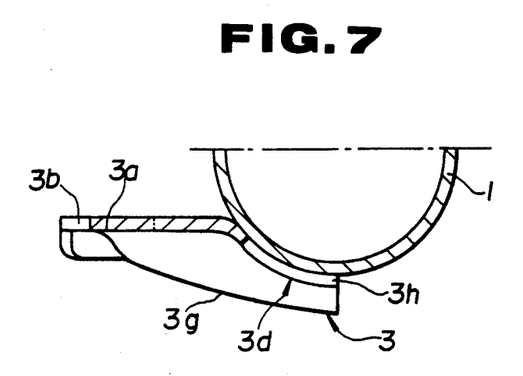
FIG. 7 is a sectional view as taken along section line VII—VII of FIG. 1.

FIG. 1 shows details of the connection bracket 3 which extends axially along one side of the outer tube 1. As shown in FIG. 4, the bracket is formed from press worked sheet metal in a manner to comprise first and second basic side member 31, 32 and an integral interconnecting bridge portion 33. The bracket includes two pairs of aligned bolt holes 3a and a connection flange 3b which extends along both the side members 31, 32 and across the bridge portion 33 and thus has an essentially inverted U-shape.

The bracket is so configured as to have three hemi-cylindrical or reduced diameter portions 3c, 3d and 3e (as they will be referred to hereafter) at the top, mid and lower portions of the bracket. These portions are adapted to fit against the outer periphery of the outer tube 1. As will be appreciated, the upper tube engaging portion 3c is formed so that it passes across the top of the bridge portion 33 while the mid and lower portions are formed in the side members 31, 32. The reduced diameter portion which is located at the middle of the bracket is partitioned into two portions by the connection flange 3b.

The side members 31, 32 are formed with circumferentially oriented cut-outs 3h which extend circumferentially inward from each end of the middle reduced diameter portion 3d. These cut-outs 3h facilitate the formation of welds "a" along the opposed edges thereof and thus serve to improve the manner in which the bracket can be fixedly secured to the outer tube. Additional welds "a" are formed across the upper peripheral edge of the bridge member 33 as best seen in FIGS. 1 and 4, and across the lower edge of the lower as reduced diameter portion 3e as best appreciated from FIG. 3.

Figure 3:
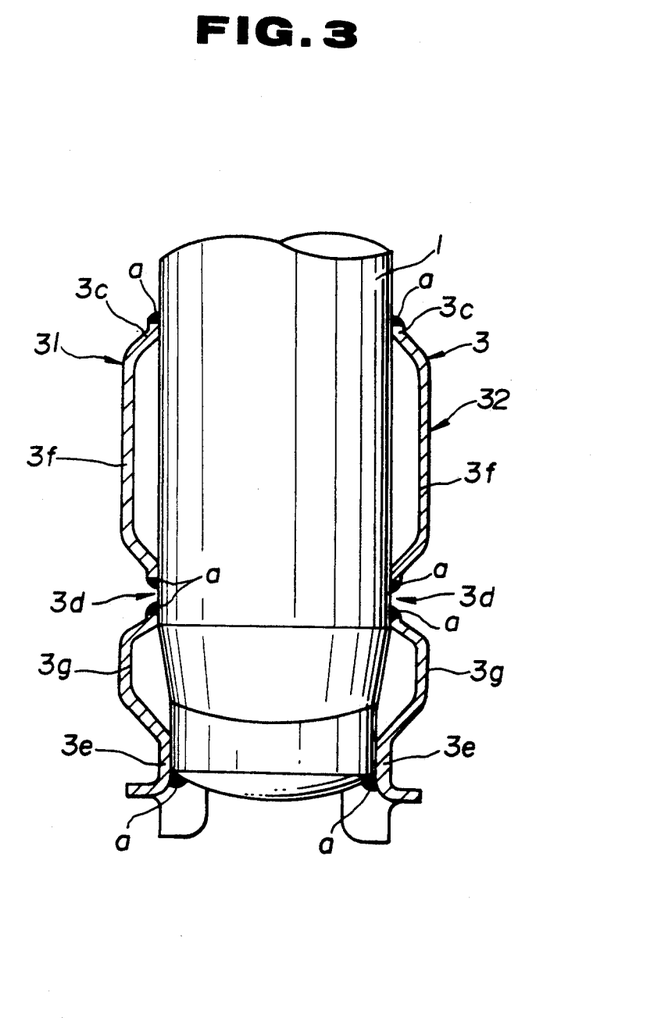
FIG. 3 is a sectional view as taken along section line III—III of FIG. 1.

Box-like projection portions 3f and 3g of the bracket which are defined between the above mentioned reduced diameter portions 3c, 3d and 3e are constructed in a manner to define spaces which have a rectangular cross-section, between themselves and the outer periphery of the outer tube 1 (see FIG. 3).

With the above described construction, the bracket having the above described construction is placed in an appropriate position on the outer tube 3 so that the reduced diameter portions 3c, 3d and 3e contact the external periphery of the same. Welds are then formed along the above described locations 3c, 3d and 3e.

When the bracket is connected in this manner the outwardly extending projections 3f and 3g define the above mentioned rectangular cross-sectioned chamber-like spaces about the periphery of the outer tube 3 and thus define a highly rigid construction.

Therefore, even when the sheet metal from which the bracket is stamped or press-worked is relatively thin, still adequate constructional strength can be obtained and thus achieve a light weight construction without structural rigidity loss and excessive weight penalties.

Further, with the instant embodiment, as the bracket is press formed in a manner to comprise the first and second basic side member 31, 32 and an integral interconnecting bridge portion 33, so that the flange 3b extends about all three of the above mentioned sections or portions and is oriented radially outward with respect to the outer tube 3, and so that the bracket does not enclose the portion of the outer tube which is located diametrically opposite the flange 3b, viz., the bracket does not extend about more than approximately half of the circumference of the outer tube 3, a structure which possess adequate structural rigidity is achieved while notably reducing the weight of the arrangement.

In addition to the above the circumferentially oriented cut-outs 3h enable welds to be formed along both sides of the same thus notably increasing the surface area which is actually subject to welding.

SECOND EMBODIMENT

Figure 8:
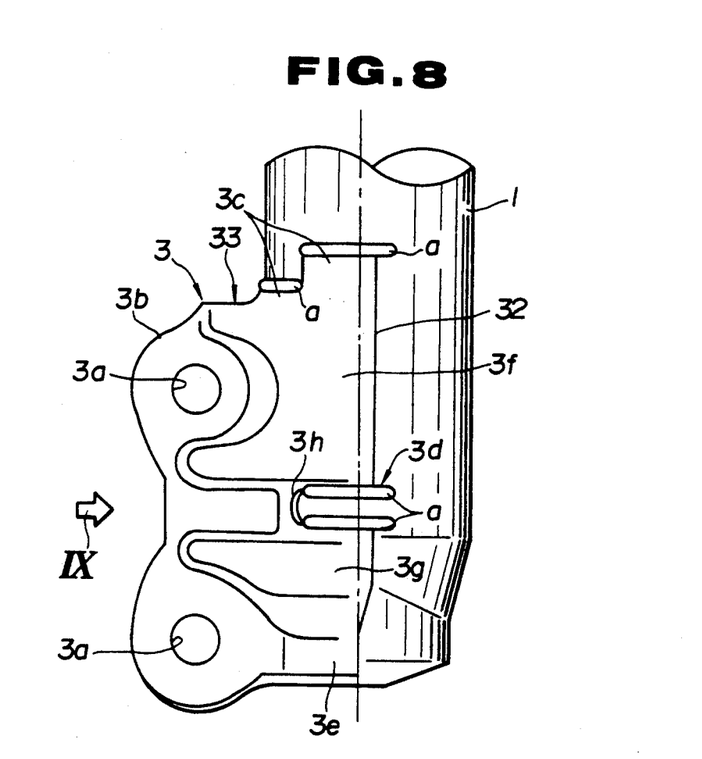
FIG. 8 is a side elevation showing a construction which characterizes a second embodiment of the present invention.
Figure 9:
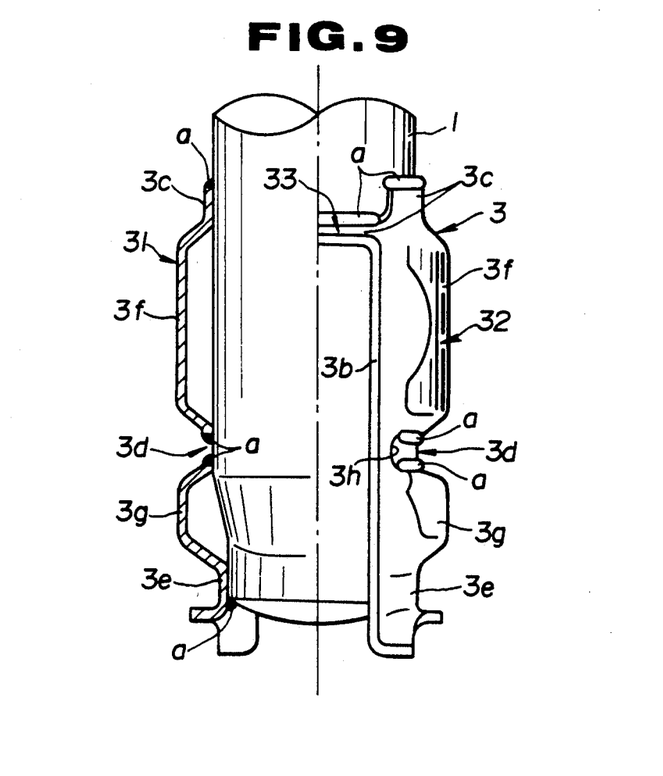
FIG. 9 is a partially sectioned elevation as seen in the direction of arrow IX of FIG. 8.

FIGS. 8 and 9 show a second embodiment of the present invention. In this arrangement the upper edge 3c of the bracket is stepped in a manner wherein the terminal portions thereof extend up in the axial direction of the outer tube 3. Welds "a" are formed along the horizontal portions of the upper edge in the illustrated manner.

This construction improves the bracket's resistance to bending under the influence of force components which act in the axial direction and thus improves the constructional strength and rigidity of the bracket.

THIRD EMBODIMENT

Figure 10:
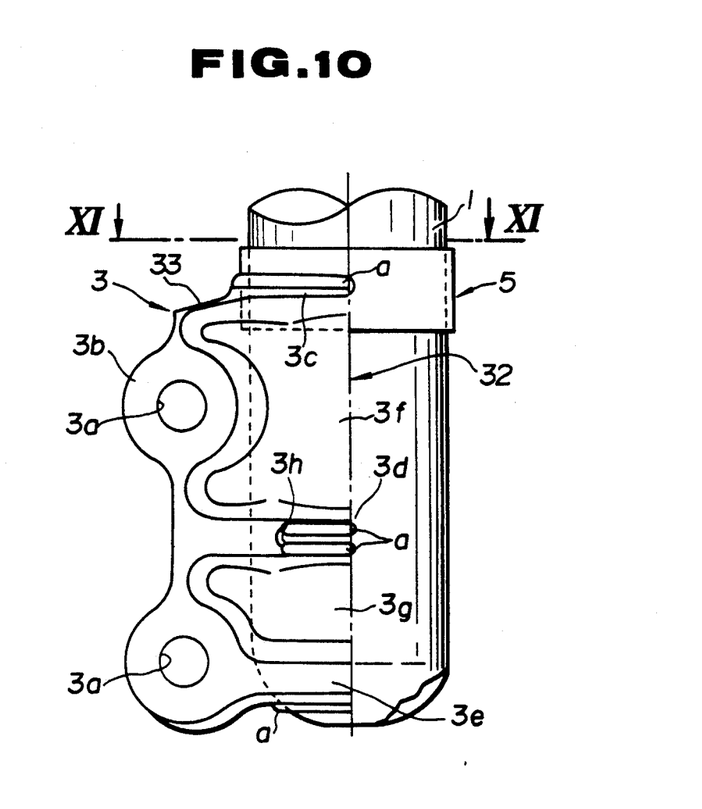
FIG. 10 is a side elevation showing a third embodiment of the present invention.
Figure 11:
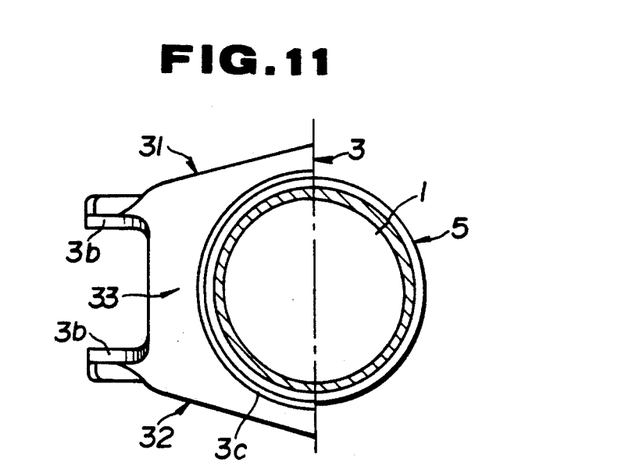
FIG. 11 is a sectional plan view as taken along section line XI—XI of FIG. 10.

FIGS. 10 and 11 show a third embodiment of the present invention. This embodiment is characterized in that an annular band-like member 5 is fixed about the outer periphery of the outer tube 3 and the upper reduced diameter portion 3c of the bracket is welded to the same.

With this embodiment, the resistance of the bracket to forces which act laterally/tangentially with respect to the outer tube is increased thus increasing the structural strength of the unit without encountering any weight penalties.

FOURTH EMBODIMENT

Figure 12:
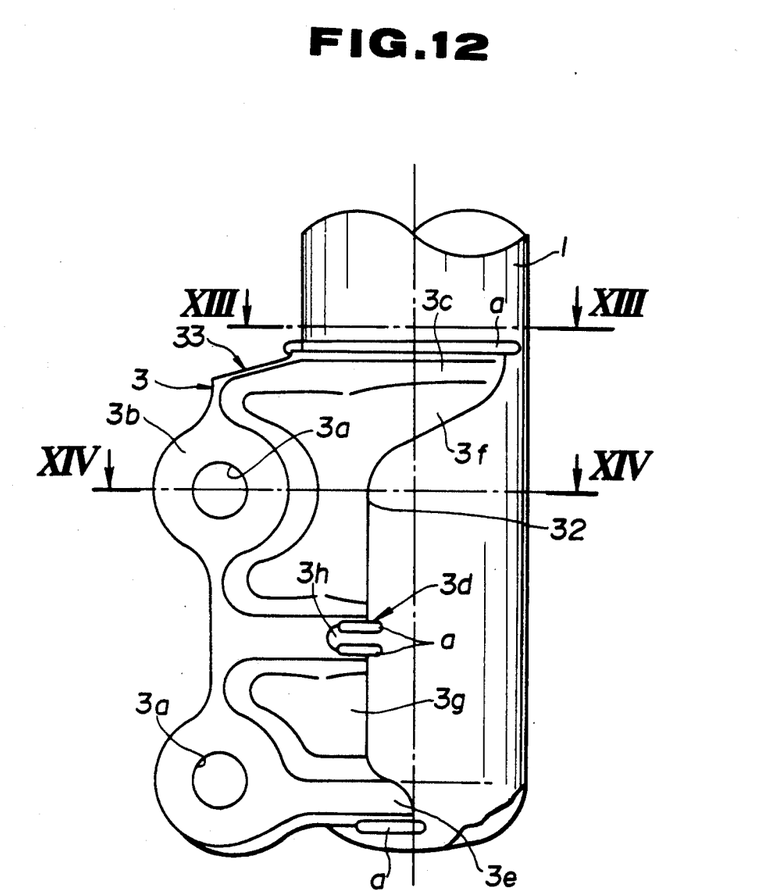
FIG. 12 is a side elevation showing the construction which characterizes a fourth embodiment of the present invention.
Figure 13:
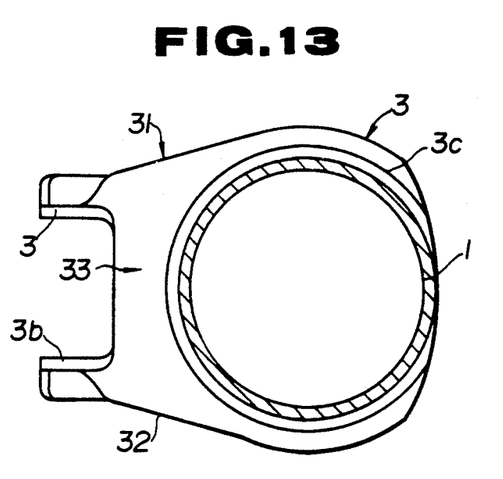
FIG. 13 is a sectional view as taken along section line XIII—XIII of FIG. 12.
Figure 14:
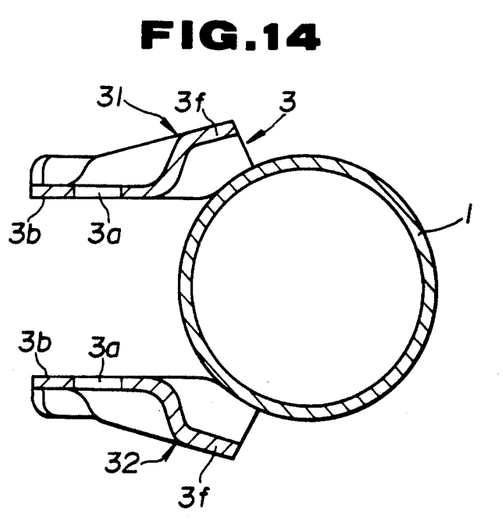
FIG. 14 is a sectional view of the fourth embodiment as taken along section line XIV—XIV of FIG. 12.

FIGS. 12 to 13 show a fourth embodiment of the present invention. In this arrangement the section of the bracket in which the upper reduced diameter portion 3c is formed is modified in a manner wherein it extends more than halfway around the periphery of the outer tube. This construction is such as to elongate the upper projected portion 3f. In addition to this the circumferentially oriented cut-outs 3h are shortened as compared with the previous embodiments.

This construction increases the resistance of the upper portion of the bracket (as seen in the drawings) to multiple axis bending or twisting under the influence of force or forces which are applied thereto from the vehicle body, is prevented while adequately ensuring sufficient structural strength to withstand the same.

Although a number of specific embodiments have been disclosed it will be understood that the present invention is not limited to the same and that various modifications and changes can be made without departing from the scope thereof. By way of example only, while the above embodiments have been disclosed as having three sites where welding can be carried out, it is possible to increase the number of the same. It is further possible to provide only a single projected portion. Additionally, it is not necessary to form the bracket so that it is divided into the above described three basic sections even though this does tend to be favorable for the purposes of achieving a light weight construction.

What is claimed is:

1. A bracket for use with a suspension strut comprising:
   first and second side members, the first and second side members being adapted to extend axially along the external periphery of a tubular member which forms part of the strut;
   a connecting member which is formed integrally with the first and second side members;
   an essentially U-shaped flange which extends along the first and second side members and the connecting member, said U-shaped flange being formed with at least one pair of connection bolt holes, which are coaxial and located opposite one another;
   a first essentially hemi-cylindrically shaped portion formed in the connecting member which is adapted to contact the tubular member and to have an edge welded to the tubular member;
   a second essentially hemi-cylindrically shaped portion formed in the first and second side members which is adapted to contact the tubular member; and
   first and second box-like projections in said first and second side members defining spaces between the bracket and the tubular member respectively, the first projection being provided between said first and second hemi-cylindrically shaped portions, the second projections being provided adjacent the second hemi-cylindrically shaped portion opposite the first projection.

2. A bracket as claimed in claim 1 wherein the bracket is so constructed and arranged as to extend approximately halfway around the perimeter of the tubular member.

3. A bracket as set forth in claim 1, further comprising cut-outs provided in circumferential edge portions of the second hemi-cylindrically shaped portion, each cut out having opposed edges which extend in the circumferential direction of the tubular member, the edges providing sites where welds can be formed to connect the bracket to the tubular member.

4. A bracket for use with a suspension strut comprising:
   first and second side members, the first and second side members being adapted to extend axially along the external periphery of a tubular member which forms part of the strut;
   a connecting member connecting between the first and second side members;
   a first essentially hemi-cylindrically shaped portion formed in the connecting member which is adapted to contact the tubular member and to have an edge welded to the tubular member;
   a second essentially hemi-cylindrically shaped portion formed in the first and second side members which is adapted to contact the tubular member and to have an edge welded to the tubular member;
   a third essentially hemi-cylindrically shaped portion formed in the first and second side members which is adapted to contact the tubular member and to have an edge welded to the tubular member;
   a flange which extends along the first and second side members and the connecting member, said flange being formed with first and second pairs of connection bolt holes, the first pair being located between said first and second hemi-cylindrically shaped portions, the second pair being located between the second and third hemi-cylindrically shaped portions; and
   first and second projections in said first and second side members defining spaces between the bracket and the tubular member respectively, the first projection being provided between said first and second hemi-cylindrically shaped portions, the second projections being provided between the second and third hemi-cylindrically shaped portions.

5. A bracket as set forth in claim 4, further comprising cut-outs in the second hemi-cylindrically shaped portion, each cut out having opposed edges which extend in the circumferential direction of the tubular member, the edges providing sites where welds are formed to connect the bracket to the tubular member.

6. A bracket as set forth in claim 4, wherein the edge of said first hemi-cylindrically shaped portion includes first and second terminal portions which are arranged in a stepwise fashion in an axial direction of the tubular member.

7. A bracket as set forth in claim 4, further comprising an annular band-like member which is fixed about an outer periphery of the tubular member, the edge of said first hemi-cylindrically shaped portion is welded to the annular band-like member.

8. A bracket as set forth in claim 4, wherein said first hemi-cylindrically shaped portion extends more than halfway around an outer periphery of the tubular member.

9. A bracket as set forth in claim 8, wherein said second hemi-cylindrically shaped portion extends less than halfway around the outer periphery of the tubular member.

10. A bracket for use with a suspension strut comprising:
   an upper circumferentially extending portion fixed on an outer periphery of the tubular member;
   a mid circumferentially extending portion fixed on the outer periphery of the tubular member;
   a lower circumferentially extending portion fixed on the outer periphery of the tubular member;
   a first projection attached to the tubular member through said upper and mid circumferentially extending portions for defining a first chamber between the bracket and the tubular member;
   a second projection attached to the tubular member through said mid and lower circumferentially extending portions for defining a second chamber between the bracket and the tubular member; and
   a flange portion extending along the first and second projections, said flange having first and second pairs of connection bolt holes, the first pair being arranged adjacent the first projection, the second pair being arranged adjacent the second projection.

* * * * *